(12) United States Patent
Iiyama et al.

(10) Patent No.: US 6,342,708 B1
(45) Date of Patent: Jan. 29, 2002

(54) IMAGE INFORMATION READING APPARATUS

(75) Inventors: Tatsuo Iiyama, Kanagawa-ken; Takashi Furutou; Yuzuru Ootsuka, both of Minamiashigara; Kenji Takata, Kanagawa-ken, all of (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/275,002

(22) Filed: Mar. 24, 1999

(30) Foreign Application Priority Data

Mar. 25, 1998 (JP) .......................................... 10-077106

(51) Int. Cl.$^7$ ................................................ B65H 5/00
(52) U.S. Cl. ...................................... 250/589; 250/590
(58) Field of Search ................................. 250/589, 590

(56) References Cited

U.S. PATENT DOCUMENTS 5,278,410 A * 1/1994 Boutet et al. ............... 250/589
5,493,128 A * 2/1996 Boutet ........................ 250/584
5,675,156 A * 10/1997 Boeve et al. ................ 250/589
5,721,436 A * 2/1998 Boeve et al. ................ 250/589

FOREIGN PATENT DOCUMENTS

JP          5-333456         12/1993

* cited by examiner

Primary Examiner—Seungsook Ham
Assistant Examiner—Shun Lee
(74) Attorney, Agent, or Firm—Sughrue Mion, PLLC

(57) ABSTRACT

An image information reading apparatus has an apparatus housing including in its front wall a cassette loading section which has first, second, third, and fourth loading regions, and a cassette placing section disposed immediately below the cassette loading section for placing a given number of cassettes therein. The operator of the image information reading apparatus temporarily places a given number of cassettes in the cassette placing section, and loads the cassettes, one by one, into the first, second, third, and fourth loading regions. No dedicated table for placing cassettes thereon is needed around the image information reading apparatus. The operator can handle the cassettes highly efficiently.

15 Claims, 12 Drawing Sheets

F I G. 9
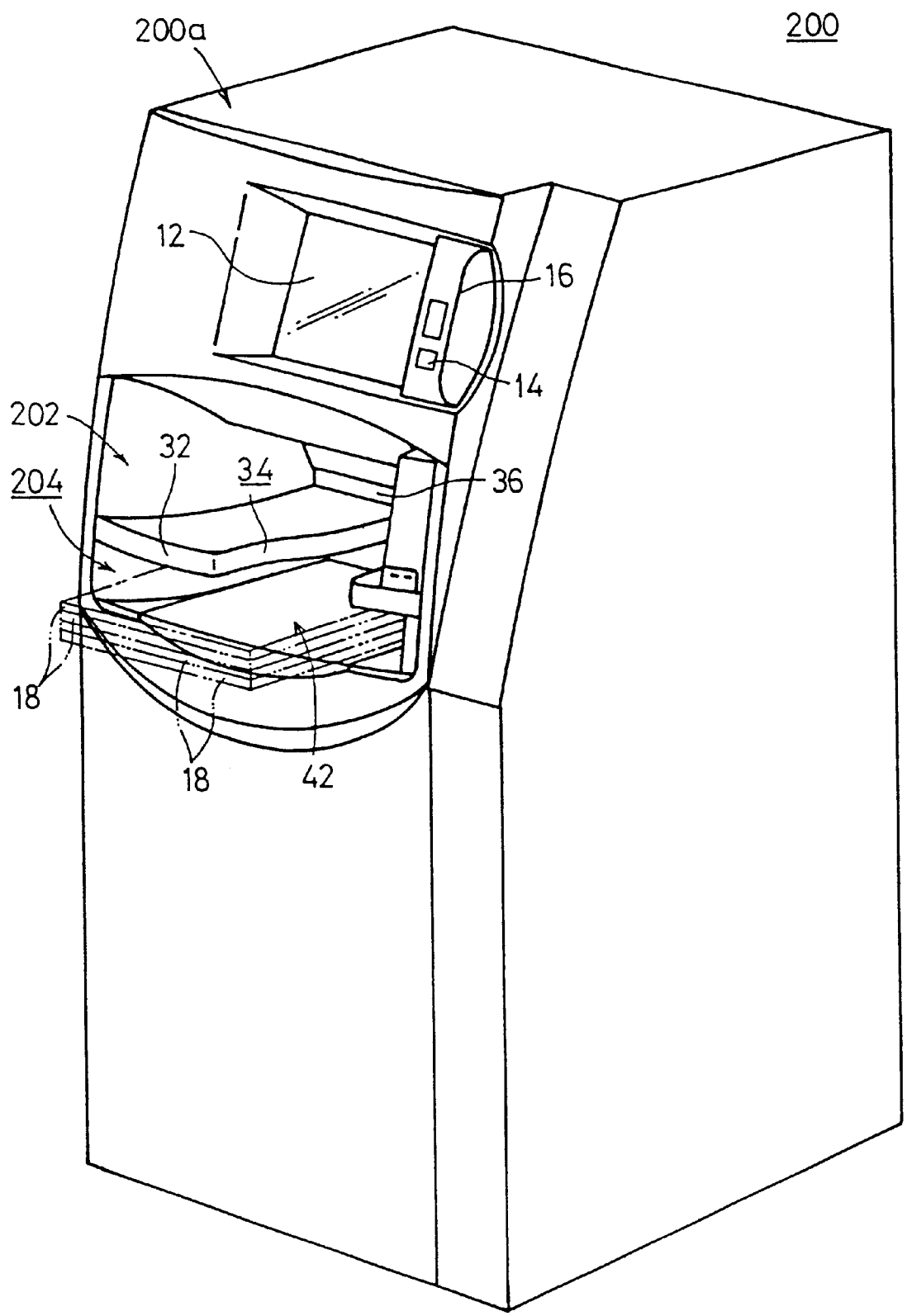

IMAGE INFORMATION READING APPARATUS

BACKGROUND OF THE INVENTION

1. Field of the Invention

The present invention relates to an image information reading apparatus for being loaded with a cassette storing a stimulable phosphor sheet, removing the stimulable phosphor sheet from the cassette, reading radiation image information recorded on the stimulable phosphor sheet, and then returning the stimulable phosphor sheet to the cassette.

2. Description of the Related Art

There has been known a radiation image recording and reproducing system for recording radiation image information of a subject, such as a human body, using a stimulable phosphor, and either reproducing the recorded radiation image information on a photosensitive medium such as a photographic film or the like or displaying the recorded radiation image information on a cathode-ray tube or other display units.

When a radiation energy such as X-rays, α-rays, γ-rays, electron beams, ultraviolet radiation, or the like is applied to a certain phosphor, it stores part of the applied radiation energy. When stimulating light such as visible light is subsequently applied to the phosphor, the phosphor emits light depending upon the stored radiation energy. Such a phosphor is referred to as a stimulable phosphor. A stimulable phosphor is usually used in the form of a sheet which is referred to as a stimulable phosphor sheet.

The radiation image recording and reproducing system includes an image information reading apparatus comprising a reading unit for reading image information recorded on a stimulable phosphor sheet and an erasing unit for erasing remaining image information from the stimulable phosphor sheet after the recorded image information has been read therefrom by the reading unit. The image information reading apparatus has a cassette loading section for receiving therein a cassette which stores a stimulable phosphor sheet on which radiation image information of a subject has been recorded by an external exposure unit.

After the cassette is inserted into the cassette loading section, the lid of the cassette is opened, and the stimulable phosphor sheet is removed from the cassette by a sheet feeding mechanism. The removed stimulable phosphor sheet is then delivered to the reading unit by a sheet delivering mechanism. The reading unit reads the radiation image information from the stimulable phosphor sheet by applying stimulating light to the stimulable phosphor sheet. Thereafter, the stimulable phosphor sheet is delivered to the erasing unit, which erases remaining image information from the stimulable phosphor sheet. The stimulable phosphor sheet is then delivered back and inserted into the cassette in the cassette loading section.

Some image information reading apparatuses have a cassette loading section for being loaded with a single cassette, and other image information reading apparatus have a cassette loading section for being loaded with a plurality of cassettes. In the former type of image information reading apparatus, the loaded cassette is replaced with a cassette each time the image reading and erasing process is finished on the stimulable phosphor sheet from the loaded cassette. In the latter type of image information reading apparatus, stimulable phosphor sheets are successively delivered from the corresponding cassettes to the reading unit and the erasing unit, and the processed stimulable phosphor sheets are successively returned to the respective cassettes, so that the stimulable phosphor sheets can efficiently be processed.

The operator of the latter type of image information reading apparatus manually handles a plurality of cassettes as follows: Since the operator finds it very difficult to hold all the cassettes together and then insert the cassettes, one by one, into the cassette loading section, it is customary for the operator to first place the cassettes on a table positioned alongside of the image information reading apparatus, and then to manually pick up and insert the cassettes, one by one, into the cassette loading section.

However, the above conventional cassette loading process is tedious and time-consuming. In addition, although an extra space for placing the table therein is needed near the image information reading apparatus, existing space limitations around the image information reading apparatus may sometimes prevent such an extra space from being provided. Furthermore, when the operator handles cassettes containing processed stimulable phosphor sheets, the operator must unload and place those cassettes, one by one, on another table.

The former type of image information reading apparatus, which is loaded with a single cassette at a time, also requires a table for placing thereon a plurality of cassettes containing unprocessed stimulable phosphor sheets, and also a table for placing thereon a plurality of cassettes containing processed stimulable phosphor sheets, for allowing the operator to handle cassettes efficiently.

The former type of image information reading apparatus is disclosed, for example, in Japanese Laid-Open Patent Publication No. 5-333456. As shown in FIG. 12, the reading apparatus comprises an apparatus housing 1, and a loading section 3 for loading a cassette 2 on the upper side of the apparatus housing 1. The loading section 3 has a feeder 5 disposed therein for removing a stimulable phosphor sheet 4 stored in the cassette 2. A feeding section 6 is provided near the feeder 5, and an erasing unit 7 is mounted on a vertical feed path of the feeding section 6. The lower part of the feeding section 6 is curved from a vertical direction into a horizontal direction, and a reading unit 8 is disposed at the end of the feeding section 6.

According to the former type of the conventional reading apparatus, the erasing unit 7 is aligned with the vertical part of the feeding section 6. Thus, especially, the dimension H of the apparatus housing 1 tends to be relatively large. However, it is a recent demand that various equipment is intensively placed in a limited space, so that a space for placing equipment is desired to be minimized.

SUMMARY OF THE INVENTION

It is a major object of the present invention to provide an image information reading apparatus which does not require a dedicated table for placing cassettes thereon, and which allows the operator to handle the cassettes efficiently.

It is another object of the present invention to provide an image information reading apparatus which minimizes a space for placing the entire apparatus.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a perspective view of an image information reading apparatus according to a second embodiment of the present invention;

DESCRIPTION OF THE PREFERRED EMBODIMENTS

Figure 1:
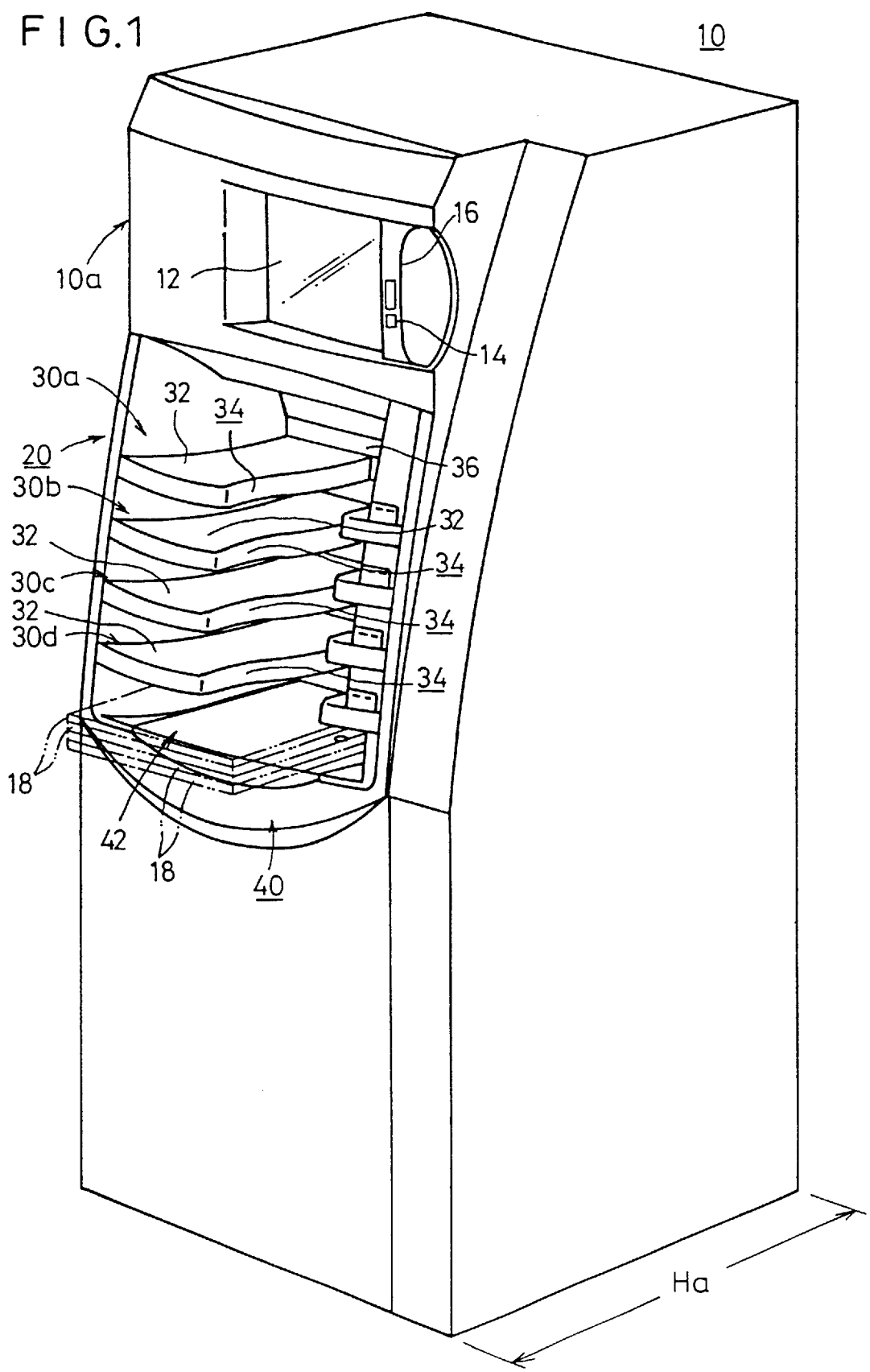
FIG. 1 is a perspective view of an image information reading apparatus according to a first embodiment of the present invention.
Figure 2:
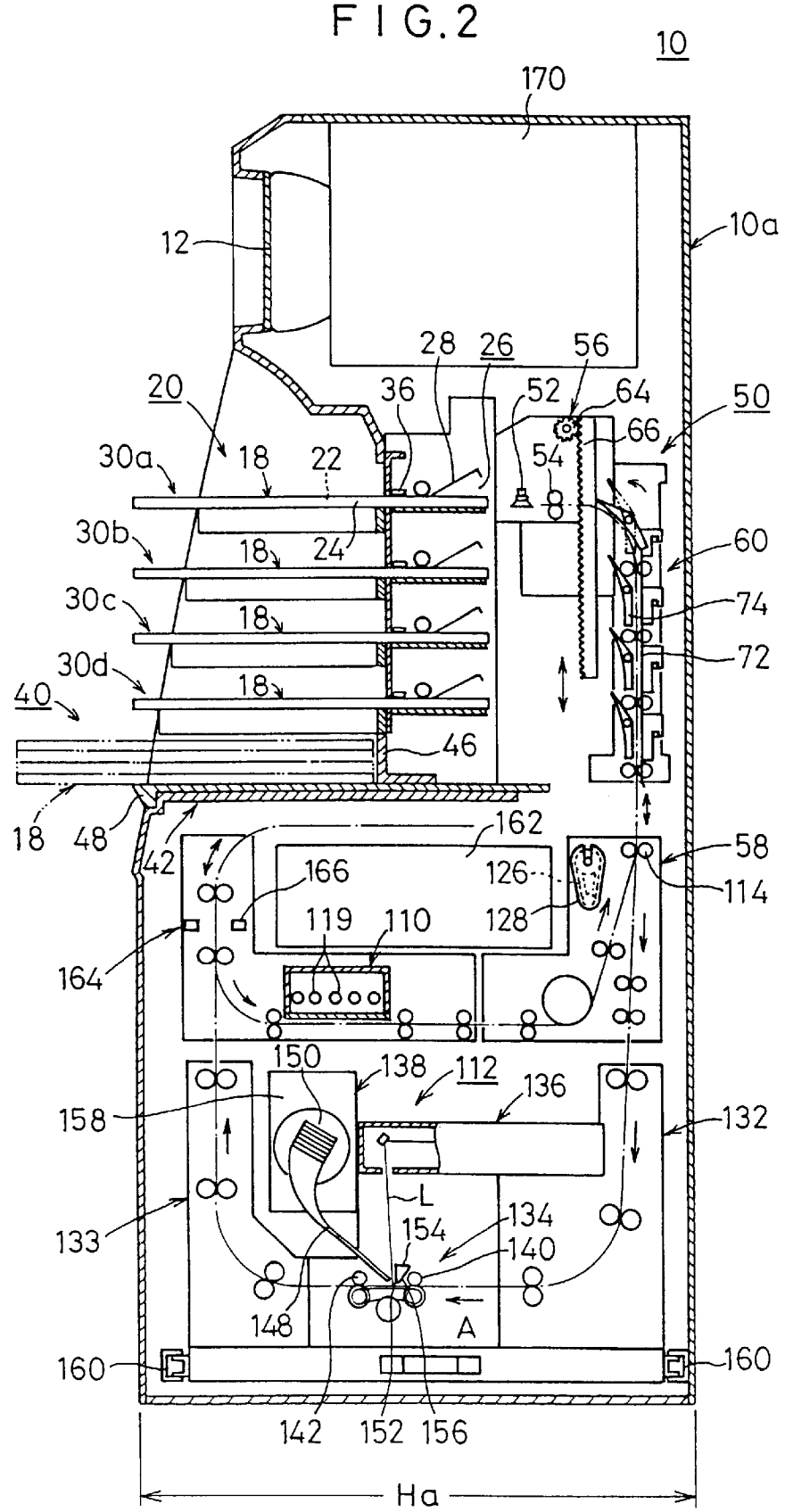
FIG. 2 is a vertical cross-sectional view of the image information reading apparatus shown in FIG. 1.

As shown in FIGS. 1 and 2, an image information reading apparatus 10 according to a first embodiment of the present invention has an apparatus housing boa including a front wall which supports on its upper portion a touch panel 12 that functions as controls and a display monitor, a main switch 14 disposed on a side of the touch panel 12, and a magnetic-card reader 16 also disposed on the side of the touch panel 12 for reading magnetic information recorded on a magnetic card inserted into the magnetic-card reader 16. The image information reading apparatus 10 also has a cassette loading section 20 disposed below the touch panel 12 for receiving a plurality of, e.g., four, cassettes 18 removably therein. Each of the cassettes 18 comprises a casing 24 for housing a stimulable phosphor sheet 22, and a lid 28 by which an opening 26 in the casing 24 is openably closed.

The cassette loading section 20 has a vertical array of four loading regions, i.e., first, second, third, and fourth loading regions 30a, 30b, 30c, 30d. The first loading region 30a which is disposed in an uppermost position has a support table 32 mounted in the apparatus housing 10a and lying in a horizontal posture. The support table 32 has a clearance area 34 shaped to keep the support table 32 out of physical interference with fingers of the operator when the operator inserts or removes a cassette 18.

A shutter 36 is openably and closably disposed in the first loading region 30a at the inner end of the support table 32. An unlocking member (not shown) is positioned inwardly of the shutter 36 for opening the lid 28 of the cassette 18 in the first loading region 30a. A lid closing member (not shown) is also positioned inwardly of the shutter 36 for closing the lid 28 of the cassette 18 in the first loading region 30a.

The second, third, and fourth loading regions 30b, 30c, 30d are identical in structure to the first loading region 30a. Those parts of the second, third, and fourth loading regions 30b, 30c, 30d which are identical to those of the first loading region 30a are denoted by identical reference characters, and will not be described in detail below.

The apparatus housing 10a has a cassette placing section 40 disposed immediately below the cassette loading section 20, i.e., immediately below the fourth loading region 30d, for temporarily placing cassettes 18 therein.

The cassette placing section 40 has a cassette holding base 42 for placing a plurality of, e.g., four or more, cassettes 18 which are stacked. The cassettes 18 placed on the cassette holding base 42 are held in a horizontal posture which is substantially parallel to those horizontal postures in which cassettes 18 are loaded in the cassette loading section 20.

Figure 3:
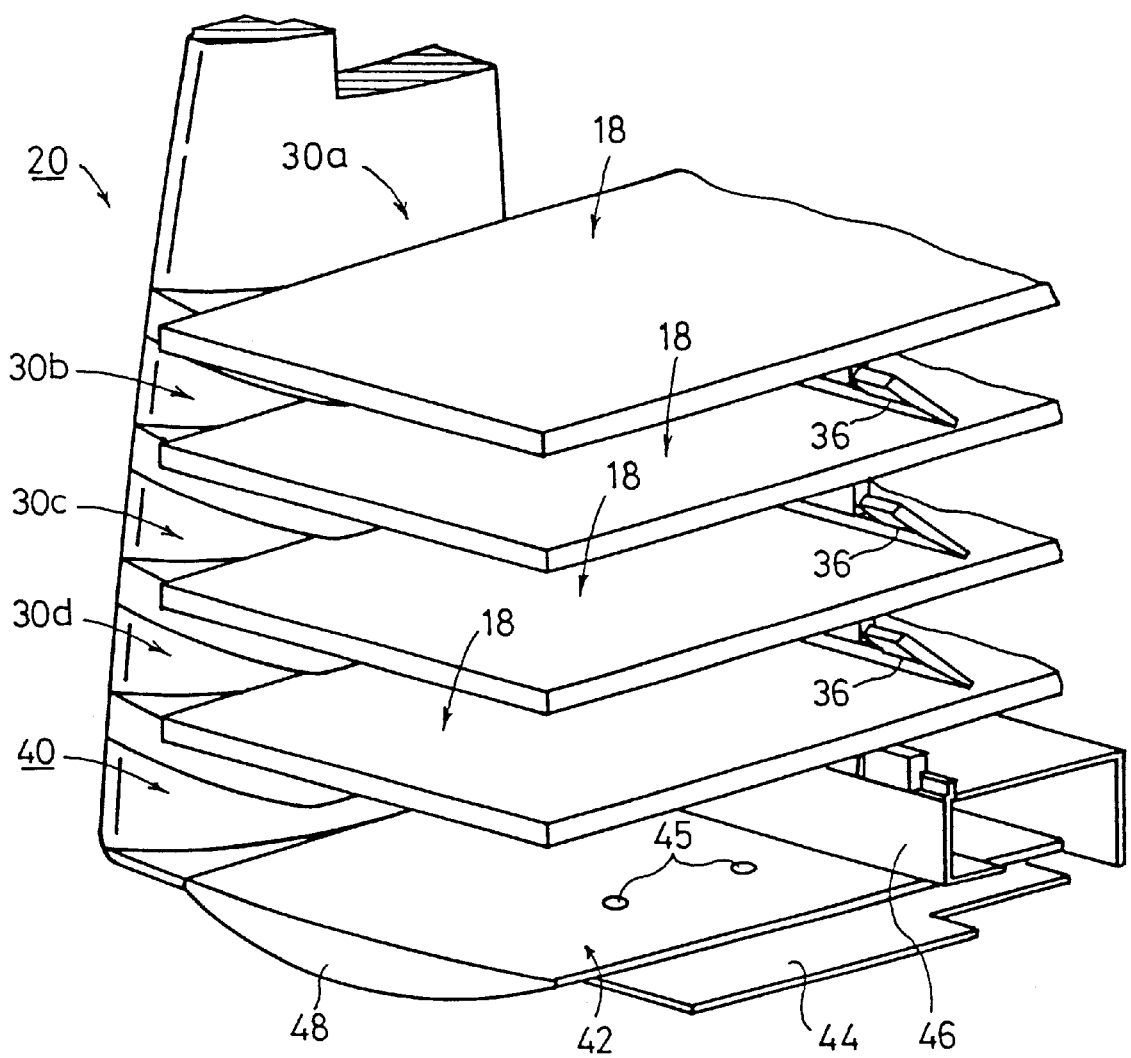
FIG. 3 is a fragmentary perspective view of a cassette loading section and a cassette placing section in the image information reading apparatus shown in FIG. 1.
Figure 4:
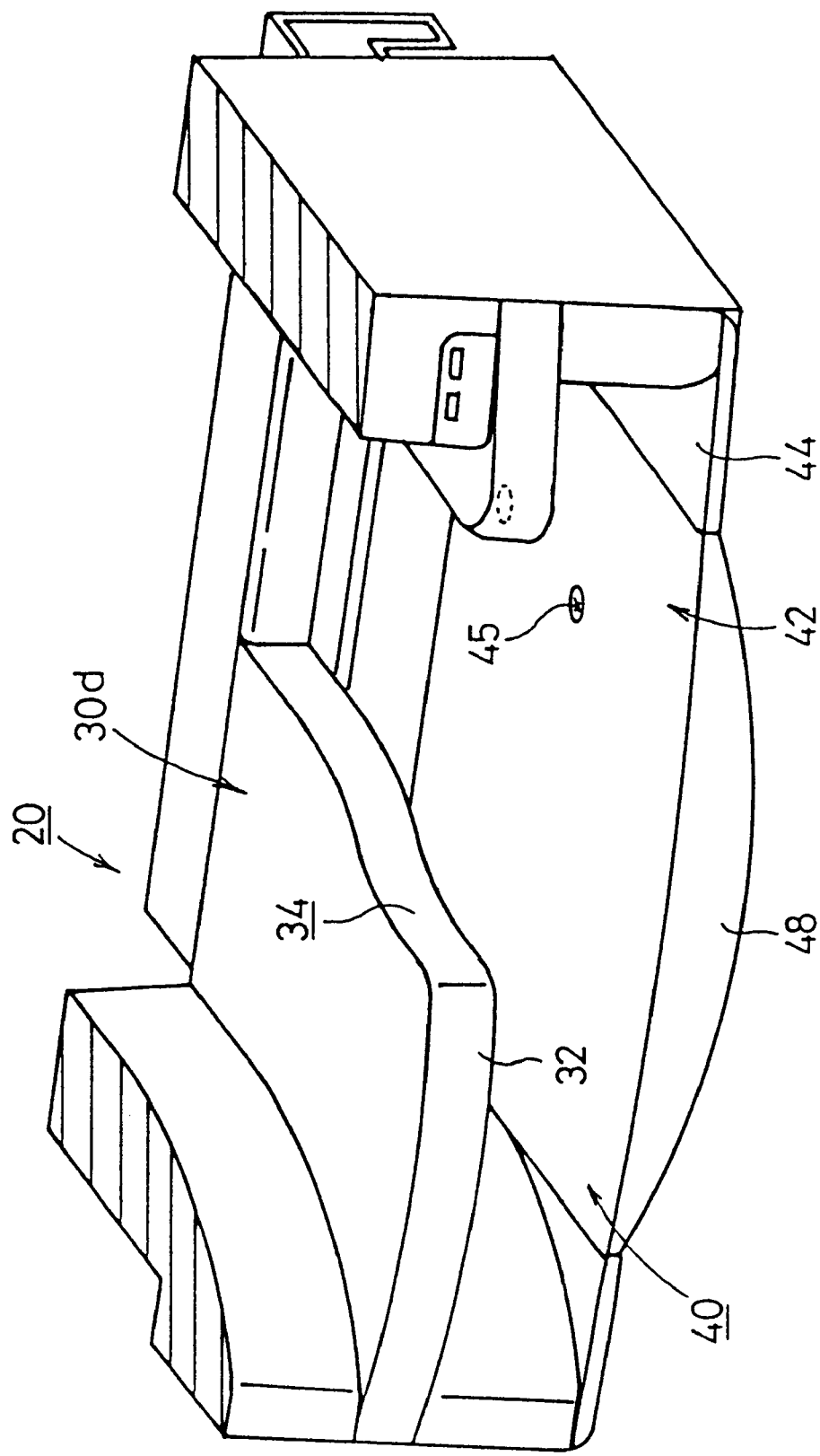
FIG. 4 is a fragmentary perspective view of the cassette placing section with a cassette holding base being shown in a front-end position.
Figure 5:
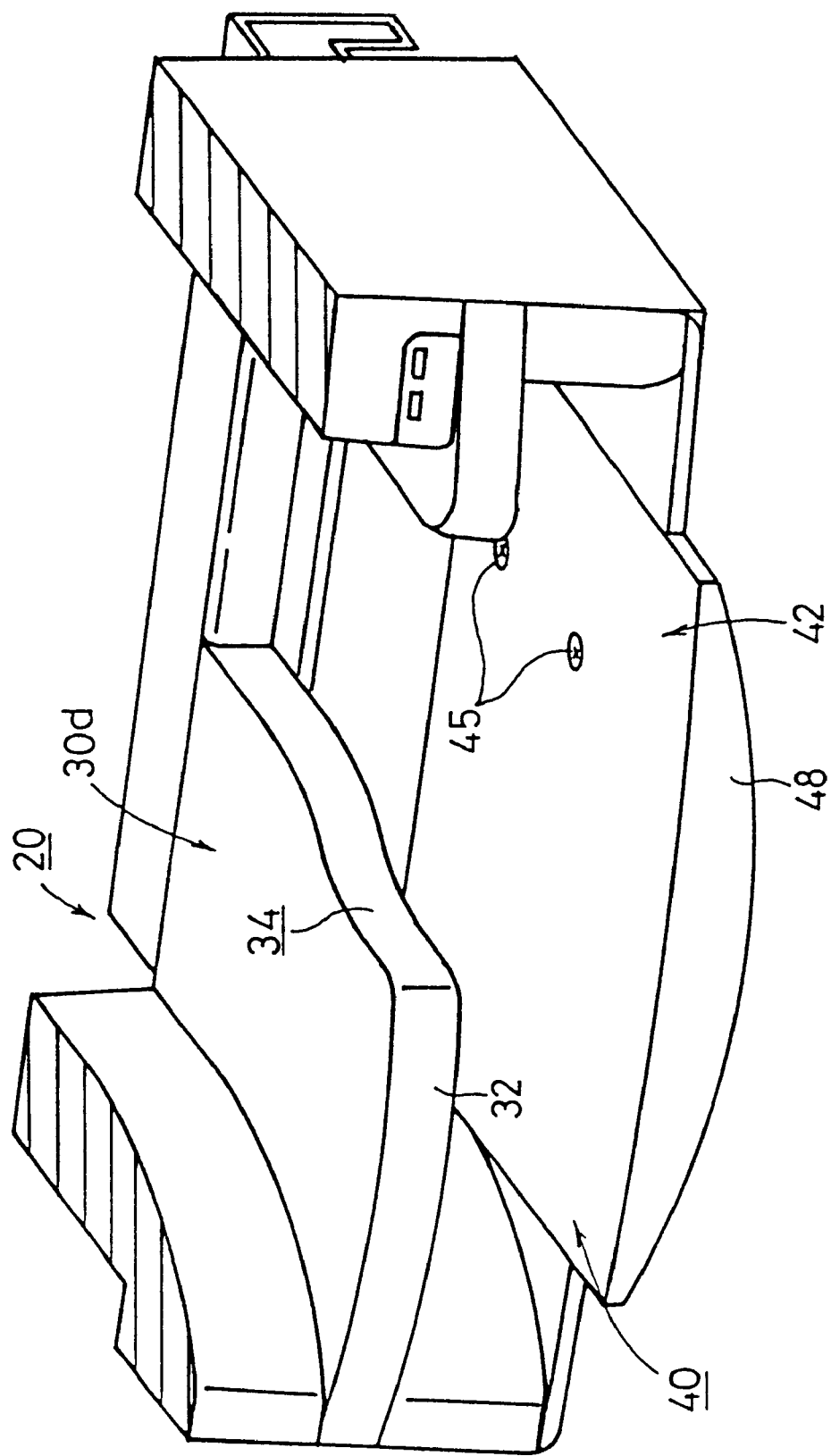
FIG. 5 is a fragmentary perspective view of the cassette placing section with the cassette holding base being shown in a rear-end position.

As shown in FIG. 3, the cassette holding base 42 is in the form of a horizontal plate which is slidable with respect to a bottom plate 44 in the apparatus housing 10a. The cassette holding base 42 is slidable with respect to the bottom plate 44, and can be fastened to the bottom plate 44 selectively in a front-end position (see FIG. 4) and a rear-end position (see FIG. 5) by bolts 45. An upwardly extending, vertical engaging plate 46 for positioning a cassette 18 of minimum size, for example, is fixed to the cassette holding base 42 near a rear end thereof. The cassette holding base 42 has on its front end a grip tongue 48 extending downwardly.

As shown in FIG. 2, the cassette loading section 20 has a vertically movable sheet feeder 50 for removing a stimulable phosphor sheet 22 from a cassette 18 in the cassette loading section 20 and returning a stimulable phosphor sheet 22, from which radiation image information has been read and remaining radiation image information has been erased, to a cassette 18 in the cassette loading section 20. The vertically movable sheet feeder 50 comprises a vertically movable base 56 supporting a plurality of suction cups 52 connected to a vacuum source and a roller pair 54 for delivering a stimulable phosphor sheet 22 received from the suction cups 52, and a path switching mechanism 60 ganged with the vertically movable base 56 for connecting a selected one of the first, second, third, and fourth loading regions 30a, 30b, 30c, 30d to a feed system (first sheet feeding section) 58.

Figure 6:
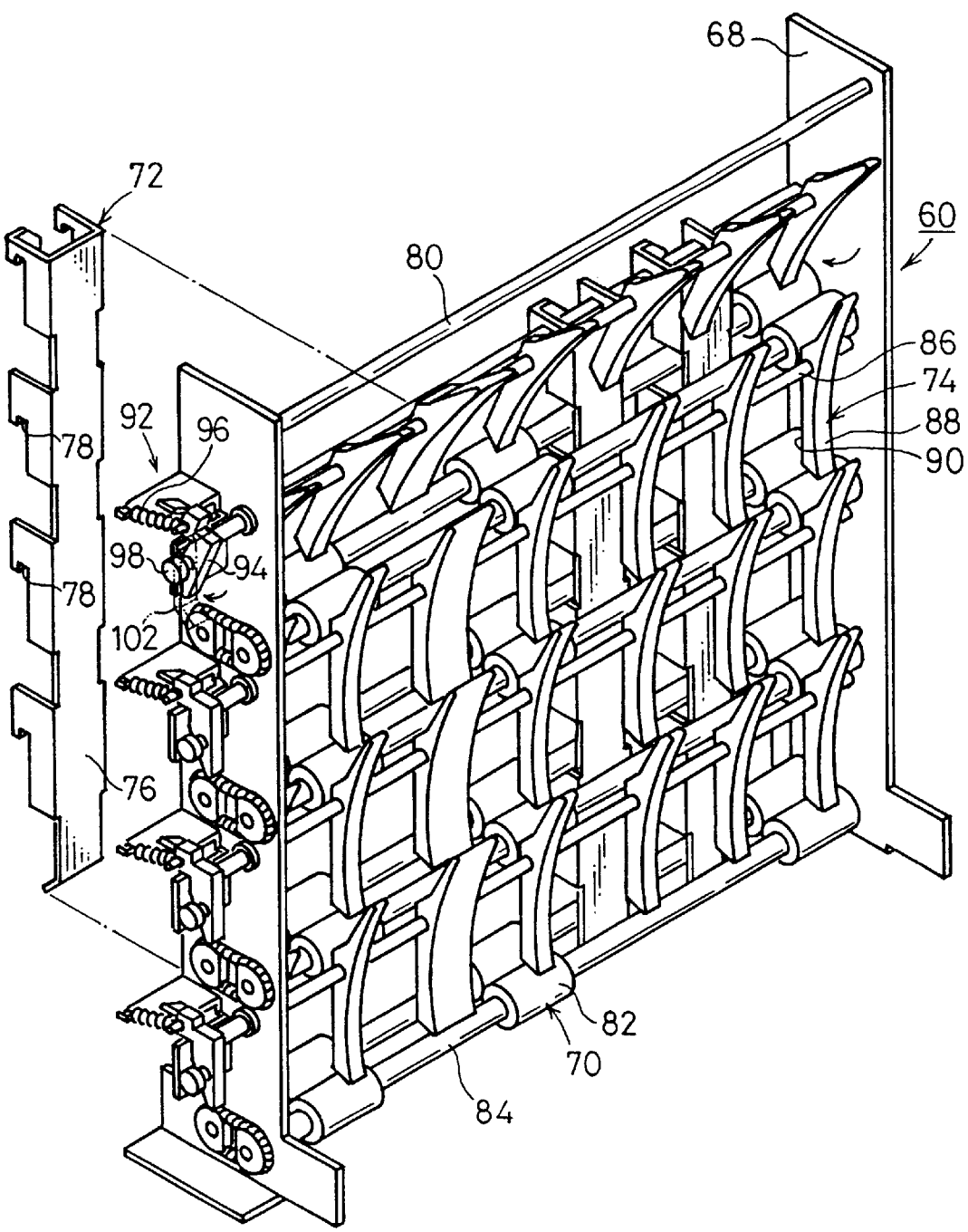
FIG. 6 is a perspective view of a path switching mechanism in the image information reading apparatus shown in FIG. 1.

The vertically movable base 56 can be positioned in horizontal alignment with any one of the first, second, third, and fourth loading regions 30a, 30b, 30c, 30d by a pair of pinions 64 coupled to a motor (not shown) and a vertical rack 66 held in mesh with the pinions 64. As shown in FIG. 6, the path switching mechanism 60 comprises a plurality of roller pairs 70 rotatably supported on a fixed frame 68, a plurality of vertical rear guide plates 72 for guiding the reverse side of a stimulable phosphor sheet 22, and a plurality of arrays of switchers 74 which are associated with the respective first, second, third, and fourth loading regions 30a, 30b, 30c, 30d, for changing feed paths for a stimulable phosphor sheet 22.

Each of the rear guide plates 72 has an integral elongate guide surface 76 extending vertically over and across the first, second, third, and fourth loading regions 30a, 30b, 30c, 30d, and a plurality of, e.g., four, vertically spaced pairs of hooks 78 extending from both sides of the guide surface 76 and oriented downwardly about 90° from the horizontal direction. The pairs of hooks 78 are supported on respective horizontal guide bars 80 mounted on the fixed frame 68. The rear guide plates 72 are positioned in alignment with small-diameter rod portions 84 extending between rollers 82 of the roller pairs 70.

Each of the arrays of switchers 74 comprises a horizontal shaft 86 rotatably supported on the fixed frame 68, and a plurality of swingable passage members 88 mounted on the shaft 86 at predetermined horizontally spaced intervals. Each of the swingable passage members 88 is normally oriented vertically by gravity, and has a guide surface 90 facing the rear guide plates 72 for confronting an exposed surface of a stimulable phosphor sheet 22. A swinging mechanism 92 is mounted on the fixed frame 68 and operatively connected to an end of each of the shafts 86. The swinging mechanism 92 comprises a follower cam 94 fixed to the end of the shaft 86 and normally tensioned by a spring 96 for causing the shaft 86 to keep the swingable passage members 88 on the shaft 86 in a vertical position. The follower cam 94 has a follower driver 98 which can be engaged by a cam 102 on the vertically movable base 56.

Figure 7:
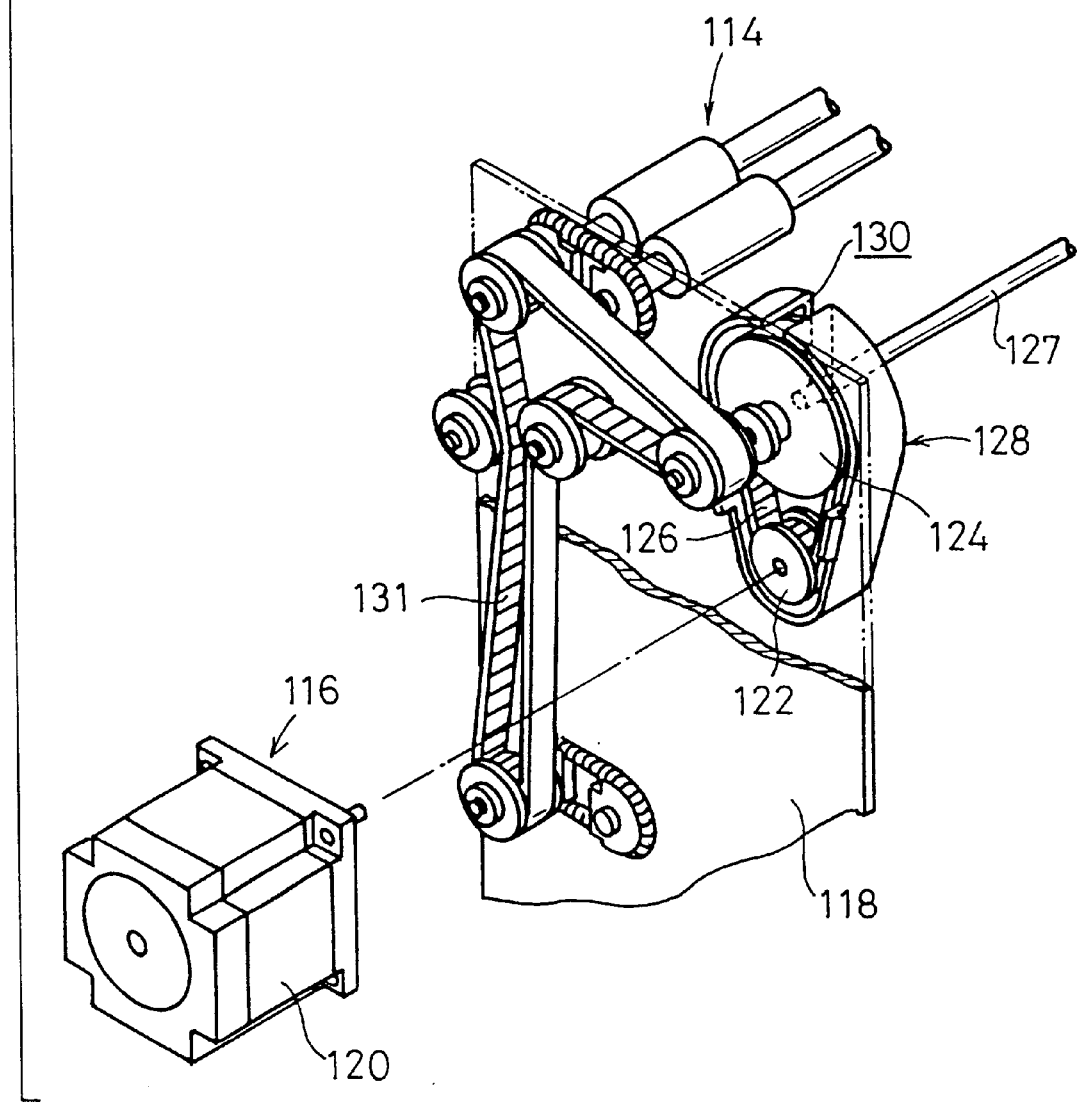
FIG. 7 is a fragmentary perspective view of an actuator mechanism of a feed system in the image information reading apparatus shown in FIG. 1.

As shown in FIG. 2, the image information reading apparatus 10 also has an erasing unit 110 and a reading unit 112 which are disposed in the apparatus housing 10*a* below the cassette placing section 40 and connected to the path switching mechanism 60 by the feed system 58. The feed system 58 comprises a plurality of roller pairs 114 which are rotated by an actuator mechanism 116 (see FIG. 7). As shown in FIG. 7, the actuator mechanism 116 comprises a motor 120 fixedly mounted on a frame 118, a small-diameter pulley 122 fixed to the drive shaft of the motor 120, a large-diameter pulley 124 fixed to an end of a rotatable shaft 127 mounted on the frame 118, and a timing belt 126 trained around the pulleys 122, 124.

The timing belt 126 is covered with a cover 128 mounted on the frame 118. The cover 128 is of a substantially pear-shaped and has a groove 130 defined in a larger-diameter end thereof for allowing the rotatable shaft 127 to be inserted therethrough when the rotatable shaft 127 is to be installed or removed. The cover 128 also has a side wall extending around the timing belt 126. Each of the roller pairs 114 is operatively connected to the rotatable shaft 127 by a belt and pulley mechanism 131.

As shown in FIG. 2, the reading unit 112 is connected to the lower end of a vertical feed path of the feed system 58, and disposed between a transverse sheet shifter feeder 132 and a subsequent sheet feeder 133. The reading unit 112 comprises an auxiliary scanning feeding mechanism 134 for delivering a stimulable phosphor sheet 22 from a cassette 18 in an auxiliary scanning direction indicated by the arrow A, an optical system 136 for applying a laser beam L as it is deflected in a main scanning direction (substantially perpendicular to the auxiliary scanning direction) to the stimulable phosphor sheet 22 as it is delivered in the auxiliary scanning direction, and a light guiding system 138 for photoelectrically reading light which is emitted from the stimulable phosphor sheet 22 when the stimulable phosphor sheet 22 is exposed to the laser beam L.

Figure 8:
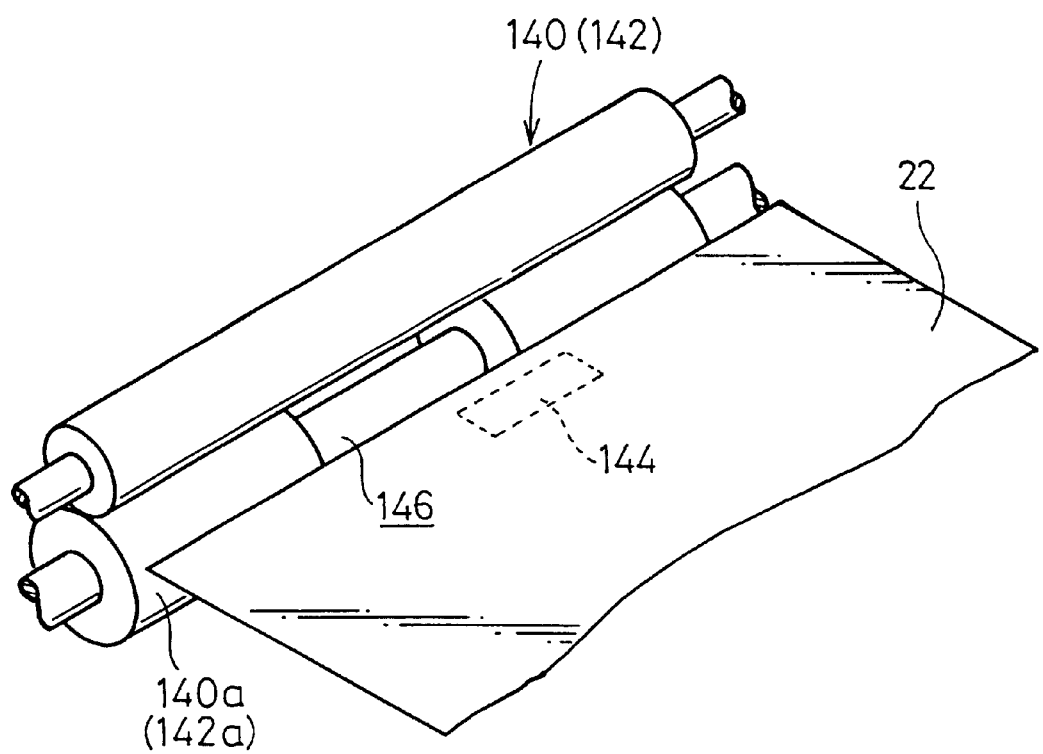
FIG. 8 is a perspective view of a roller pair in a reading unit in the image information reading apparatus shown in FIG. 1.

The auxiliary scanning feeding mechanism 134 has first and second roller pairs 140, 142 rotatable in synchronism with each other. Each of the first and second roller pairs 140, 142 has a pair of rollers that can be moved toward and away from each other. As shown in FIG. 8, a bar-code label 144 is applied to the reverse side of each stimulable phosphor sheet 22. At least the lower rollers (drive rollers) 140*a*, 142*a* of the first and second roller pairs 140, 142 have clearance grooves 146 of certain axial length which are defined therein for avoiding physical contact between roller surfaces and the bar-code label 144. The clearance grooves 146 may be located in a plurality of axially spaced positions on the lower rollers 140*a*, 142*a* to meet possible changes in the position of the bar-code label 144.

As shown in FIG. 2, the light guiding system 138 has a light guide 148 disposed near the position where the stimulable phosphor sheet 22 is scanned by the laser beam L and extending in the main scanning direction, a photomultiplier 150 mounted on an upper end of the light guide 148, and a mirror mount 154 incorporating a reflecting mirror 152. The mirror mount 154 has a tapered surface 156 for guiding the stimulable phosphor sheet 22 in the auxiliary scanning direction indicated by the arrow A. The photomultiplier 150 is fixed to a frame 158 so as to be less vibratable in operation. The reading unit 112 can be pulled out of the apparatus housing 10*a* along linear guides 160 while being integrally combined with the transverse sheet shifter feeder 132 and the subsequent sheet feeder 133 in predetermined relatively positioned relationship.

When a stimulable phosphor sheet 22 is fed from the reading unit 112 upwardly by the subsequent sheet feeder 133 which is positioned rearwardly of the reading unit 112 with respect to the auxiliary scanning direction, the leading end of the stimulable phosphor sheet 22 is guided horizontally over a power supply 162 above the erasing unit 110 via an erasing unit feeder (second sheet feeding section) 164 disposed near the power supply 162. The erasing unit feeder 164 then feeds the stimulable phosphor sheet 22, whose leading end has been fed over the power supply 162, horizontally from the left to the right into the erasing unit 110. The erasing unit feeder 164 includes a sensor 166 disposed near its vertical feed path for detecting when the stimulable phosphor sheet 22 through the erasing unit feeder 164. The erasing unit 110 has a plurality of erasing light sources 119 disposed above a horizontal feed path of the erasing unit feeder 164. The horizontal feed path of the erasing unit feeder 164 is connected to an upwardly oblique feed path which is connected to the feed system 58.

A controller 170 is disposed in an upper end portion of the apparatus housing 10*a*, for controlling various processes carried out in the apparatus housing 10*a*, storing image information read by the reading unit 112, and outputting the stored image information to an output machine or a network at the time it is idle.

Operation of the image information reading apparatus 10 will be described below.

There are four cassettes 18, for example, for insertion into the cassette loading section 20, each storing a stimulable phosphor sheet 22 which carries radiation image information of a subject such as a human body recorded by an exposure device (not shown). The operator holds the four cassettes 18 as stacked together, and moves toward the front wall of the apparatus housing 10*a*.

Then, the operator places the four stacked cassettes 18 onto the cassette holding base 42 of the cassette placing section 40 directly below the cassette loading section 20. Thereafter, the operator grips the uppermost cassette 18 of the stack on the cassette holding base 42, and loads the gripped cassette 18 into the first loading region 30*a* of the cassette loading section 20.

At this time, the cassette 18 is introduced along the support table 32 of the first loading region 30*a* into the cassette loading section 20. The leading end of the cassette 10 pushes open the shutter 36, and enters the interior space of the apparatus housing 10*a*. When the cassette 18 is inserted into the first loading region 30*a*, the lid 28 thereof is unlocked by the unlocking member, and angularly moved to a certain angular position, as shown in FIG. 1, thus opening the opening 26.

After the cassette 18 has been inserted into the first loading region 30*a*, the operator grips the uppermost cassette 18 of the remaining stack on the cassette holding base 42, and loads the gripped cassette 18 into the second loading region 30b of the cassette loading section 20. Subsequently, the operator loads the next cassette 18 from the remaining stack on the cassette holding base 42 into the third loading region 30c, and then loads the last cassette 18 on the cassette holding base 42 into the fourth loading region 30d.

After the cassettes 18 have been loaded in the respective first, second, third, and fourth loading regions 30a, 30b, 30c, 30d, the vertically movable sheet feeder 50 is vertically displaced to a vertical position corresponding to a desired one of the loaded cassettes 18. Specifically, the non-illustrated motor is energized to cause the pinions 64 and the rack 66 to vertically move the vertically movable base 56 to the position vertical position corresponding to the desired one of the loaded cassettes 18.

The cam 102 on the vertically movable base 56 now engages the swinging mechanism 92 of the path switching mechanism 60 which is associated with the first loading region 30a. The cam 102 pushes the follower driver 98 to move the follower cam 94 in the direction indicated by the arrow in FIG. 6 against the bias of the spring 96. The swingable passage members 88 mounted on the shaft 86 of the array of switchers 74 which is fixed to the follower cam 94 are then turned from the two-dot-and-dash-line position to the solid-line position shown in FIG. 2. At this time, the path switching mechanism 60 provides a path from the first loading region 30a to the feed system 58.

As described above, simply when the vertically movable base 56 moves vertically, one of the arrays of switchers 74 which are associated with the respective first, second, third, and fourth loading regions 30a, 30b, 30c, 30d is angularly moved. Therefore, the paths between the first, second, third, and fourth loading regions 30a, 30b, 30c, 30d and the feed system 58 can be selected one at a time by a simple arrangement without the need for a special complex actuator mechanism for the arrays of switchers 74. The swingable passage members 88 of the switchers 74 have their center of gravity positioned to keep themselves in a vertical orientation by gravity. Therefore, even if one of the springs 96 is broken, the swingable passage members 88 of the corresponding array of switchers 74 are prevented from swing to a horizontal orientation, thereby avoiding unwanted damage to a stimulable phosphor sheet 22 that may have happen to pass through the path switching mechanism 60.

In the path switching mechanism 60, the rear guide plates 72 are positioned in alignment with the small-diameter rod portions 84 extending between the rollers 82 of the roller pairs 70, and the integral elongate guide surfaces 76 thereof extend vertically over and across the first, second, third, and fourth loading regions 30a, 30b, 30c, 30d. The integral elongate guide surfaces 76 serve to guide the rear surface of a stimulable phosphor sheet 22 continuously in the vertical direction through the path switching mechanism 60. As a result, since the rear guide plates 72 do not have interrupted guide surfaces, a stimulable phosphor sheet 22 will smoothly be guided in the vertical direction through the path switching mechanism 60 without being damaged.

The suction cups 52 of the vertically movable sheet feeder 50 are displaced into the corresponding cassette 18, and attract the stimulable phosphor sheet 22 in the cassette 18. Then, the suction cups 52 which have attracted the stimulable phosphor sheet 22 in the cassette 18 are displaced back out of the cassette 18 toward the roller pair 54 until the leading end of the stimulable phosphor sheet 22 is gripped by the roller pair 54. When the leading end of the stimulable phosphor sheet 22 is gripped by the roller pair 54, the suction cups 52 release the stimulable phosphor sheet 22, which is then delivered through the path switching mechanism 60 to the feed system 58 by the roller pair 54.

The stimulable phosphor sheet 22 is fed downwardly by the roller pairs 114 of the feed system 58. The stimulable phosphor sheet 22 is transversely positioned by the transverse sheet shifter feeder 132, and then delivered to the reading unit 112. In the reading unit 112, the stimulable phosphor sheet 22 is delivered in the auxiliary scanning direction indicated by the arrow A by the first and second roller pairs 140, 142, and the optical system 136 is energized to apply the laser beam L to the rear surface of the stimulable phosphor sheet 22 in the main scanning direction. Upon exposure to the laser beam L, the stimulable phosphor sheet 22 emits light depending on the radiation image information recorded on the stimulable phosphor sheet 22. The emitted light is led from the light guide 148 to the photomultiplier 150, which photoelectrically reads the radiation image information that is carried by the light emitted from the stimulable phosphor sheet 22.

In the light guide system 138, the tapered surface 156 of the mirror mount 154 guides the stimulable phosphor sheet 22, which is being delivered in the auxiliary scanning direction indicated by the arrow A by the auxiliary scanning feeding mechanism 134, toward the reflecting mirror 152 and the light guide 148. Consequently, the reflecting mirror 152 and the light guide 148 can be positioned near the path of the stimulable phosphor sheet 22 in the reading unit 112 for increased efficiency with which to receive light emitted from the stimulable phosphor sheet 22.

The lower rollers 140a, 142a of the first and second roller pairs 140, 142 have the clearance grooves 146 defined therein in positional alignment with the bar-code label 144.

Because the bar-code label 144 do not contact the lower rollers 140a, 142a, the stimulable phosphor sheet 22 is prevented from being displaced vertically by the bar-code label 144 due to the thickness thereof. Consequently, inasmuch as the stimulable phosphor sheet 22 is maintained in constant positional relationship to the light guide 148, errors which would otherwise occur in detecting the light emitted from the stimulable phosphor sheet 22 on account of positional instability of the stimulable phosphor sheet 22 with respect to the light guide 148 are effectively prevented.

In addition, because the photomultiplier 150 is fixed to the frame 158, errors which would otherwise occur in detecting the light emitted from the stimulable phosphor sheet 22 due to unwanted vibrations of the photomultiplier 150 are also prevented. The reading unit 112 can be pulled out of the apparatus housing 10a along the linear guides 160 M while being integrally combined with the transverse sheet shifter feeder 132 and the subsequent sheet feeder 133 in predetermined relatively positioned relationship. Therefore, the reading unit 112 can easily be serviced for maintenance. As the reading unit 112 is integrally combined with the transverse sheet shifter feeder 132 and the subsequent sheet feeder 133, the stimulable phosphor sheet 22 can be fed stably through the transverse sheet shifter feeder 132, the reading unit 112, and the subsequent sheet feeder 133.

After the recorded radiation image information has been read from the stimulable phosphor sheet 22, the stimulable phosphor sheet 22 is fed upwardly by the-subsequent sheet feeder 133. The leading end of the stimulable phosphor sheet 22 is guided horizontally over the power supply 162 by the erasing unit feeder 164, after which the stimulable phosphor sheet 22 is transferred from the subsequent sheet feeder 133 to the erasing unit feeder 164. In the erasing unit feeder 164, when the stimulable phosphor sheet 22 passes across the sensor 166, the sensor 166 sends a detected signal to the controller 170, which inactivates the erasing unit feeder 164. At this time, the controller 170 de-energizes a motor of the erasing unit feeder 164 directly based on the detected signal from the sensor 166, but not on computer software. Therefore, the stimulable phosphor sheet 22 is prevented from running out of the erasing unit feeder 164 due to a computer software failure. Then, the erasing unit feeder 164 which has been inactivated is actuated again in a reverse direction to feed the stimulable phosphor sheet 22 backwards horizontally into the erasing unit 110. While the stimulable phosphor sheet 22 is passing through the erasing unit 110, the erasing light sources 119 apply light to the stimulable phosphor sheet 22 thereby to erase unwanted remaining radiation image information from the stimulable phosphor sheet 22. The stimulable phosphor sheet 22 is delivered from the erasing unit 110 upwardly into the feed system 58. Then, the stimulable phosphor sheet 22 is returned into the empty cassette 18 in the first loading region 30a, for example, by the vertically movable sheet feeder 50.

As shown in FIG. 7, each of the roller pairs 114 of the feed system 58 has the timing belt 126 for transmitting the rotation from the motor 120 via the rotatable shaft 127, and the timing belt 126 is covered with the cover 128. The cover 128 is effective to prevent dust particles produced by the timing belt 126 from being scattered in the apparatus housing 10a.

When the first stimulable phosphor sheet 22 is fed to a position immediately in front of the reading unit 112, the vertically movable sheet feeder 50 is vertically moved to a position for delivering the stimulable phosphor sheet 22 in the cassette 18 which is loaded in the third loading region 30c, for example. When the first stimulable phosphor sheet 22 starts being processed by the reading unit 112, the next stimulable phosphor sheet 22 starts being removed from the cassette 18 which is loaded in the third loading region 30c. Therefore, a plurality of stimulable phosphor sheets 22 can simultaneously be processed in the apparatus housing 10a, and hence the radiation image information recorded on those stimulable phosphor sheets 22 can efficiently be processed. After the stimulable phosphor sheets 22 stored in all the cassettes 18 loaded in the first, second, third, and fourth loading regions 30a, 30b, 30c, 30d have been processed for reading the recorded radiation image information and erasing remaining radiation image information, the operator manually pulls the cassettes 18 from the cassette loading section 20.

Specifically, the operator pulls the cassette 18 loaded in the first loading region 30a along the support table 32. As the cassette 18 is pulled out, the lid 28 of the cassette 18 is closed by the lid closing member (not shown) in the first loading region 30a, and the cassette 18 is removed from the first loading region 30a with the opening 26 being closed in a light-shielded condition. The operator places the cassette 18 removed from the first loading region 30a on the cassette holding base 42 of the cassette placing section 40. Similarly, the operator removes the cassettes 18 successively from the second, third, and fourth loading regions 30b, 30c, 30d, and places them on the cassette holding base 42. Then, the operator holds together the four cassettes 18 stacked on the cassette holding base 42, and takes them to the non-illustrated exposure device or the like.

In the first embodiment, the cassette placing section 40 for placing cassettes 18 therein is disposed immediately below the cassette loading section 20. The cassette holding base 42 supports thereon as many cassettes 18 as the number of the loading regions 30a–30d, to be loaded respectively into the cassette loading section 20, or more cassettes 18 than the number of the loading regions 30a–30d, to be loaded respectively into the cassette loading section 20.

The operator loads the cassettes 38 on the cassette holding base 42, one by one, into the first, second, third, and fourth loading regions 30a, 30b, 30c, 30d.

Accordingly, the operator is not required to carry out an inefficient work to carry cassettes, one by one, from the exposure device to the image information reading apparatus 10, and a separate table for holding four or more cassettes 18 thereon is not required to be provided near the image information reading apparatus 10. Since the operator is only needed to handle cassettes 18 between the cassette loading section 20 and the cassette placing section 40 positioned immediately therebelow, the operator can handle the cassettes 18 efficiently only in the vertical direction.

Accordingly, the image information reading apparatus 10 allows the operator to handle cassettes 18 highly efficiently. Particularly, the operator can handle a plurality of cassettes 18 smoothly and quickly for increased efficiency. Since no separate table is required near the image information reading apparatus 10 for temporarily placing cassettes 18 thereon, no table installation space is needed around the image information reading apparatus 10, and hence any existing space around the image information reading apparatus 10 can effectively be utilized.

The cassette holding base 42 is slidable with respect to the bottom plate 44, and can be fastened to the bottom plate 44 selectively in the front-end position (see FIG. 4) and the rear-end position (see FIG. 5) by the bolts 45. Therefore, the operator can select the position of the cassette holding base 42 as one of those front- and rear-end positions for easy manual operation to handle cassettes 18 more efficiently. The engaging plate 46, which is fixed to the cassette holding base 42, may be positionally selected depending on the dimensions of the cassettes 18 placed on the cassette holding base 42. The engaging plate 46 serves as a stop for preventing the cassettes 18 from being inserted excessively into the apparatus housing 10a, thus permitting the operator to handle the cassettes 18 with ease in front of the image information reading apparatus 10.

In the first embodiment, the stimulable phosphor sheet 22 is disposed in the cassette loading section 20 such that a recordable surface thereof faces downward. Under the cassette loading section 20, the erasing unit 110 is positioned over the reading unit 112. The reading unit 112 reads recorded information with the recordable surface thereof facing upward, and also the erasing unit 110 erases remaining radiation image information with the recordable surface thereof facing upward.

Therefore, as shown in FIGS. 1 and 2, the dimension Ha of the apparatus housing 10a is minimized, thereby the floor space for placing the apparatus housing 10a can be drastically reduced. As a result, The apparatus housing 10a can be easily placed in a small installation space, which results in effective utilization of space.

Further, in the first embodiment, the image information reading apparatus 10 has the feed system 58 for feeding the stimulable phosphor sheet 22 from the cassette loading section 20 to the reading unit 112, and the erasing unit feeder 164 for feeding the stimulable phosphor sheet 22 whose information has been read from the erasing unit 110 to the vertical part of the feed system 58.

Therefore, a plurality of, for example, two stimulable phosphor sheets 22 can be simultaneously fed in the apparatus housing 10a. Then, the information of one of the stimulable phosphor sheets 22 can be read in the reading unit 112, while remaining information of the other of the stimulable phosphor sheets 22 can be erased in the erasing unit 110. Consequently, the respective stimulable phosphor sheets 22 can be easily processed at a high speed in the apparatus housing 10a.

The cassette holding base 42 can optionally be attached on the apparatus housing 10a, after the image information reading apparatus 10 is disposed on the cassette holding base 42. Further, the cassette holding base 42 is disposed immediately below the cassette loading section 20. However, the cassette holding base 42 may be disposed at least downwardly with respect to the cassette loading section 20, or may be disposed in either of position leftward or rightward with respect to said cassette loading section.

Figure 10:
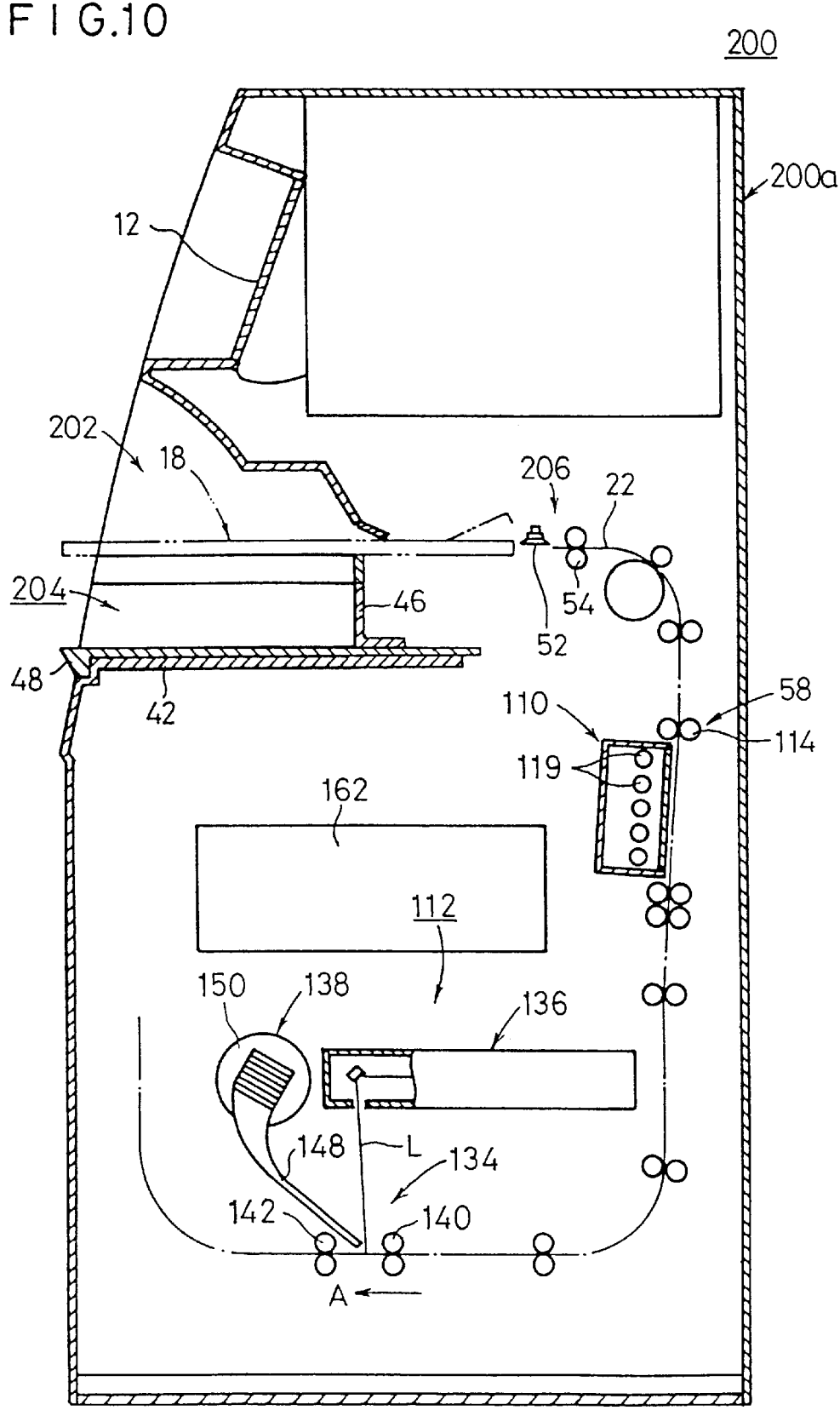
FIG. 10 is a vertical cross-sectional view of the image information reading apparatus shown in FIG. 9.

FIG. 9 shows in perspective an image information reading apparatus 200 according to a second embodiment of the present invention. FIG. 10 shows in vertical cross section the image information reading apparatus 200. Those parts of the image information reading apparatus 200 which are identical to those of the image information reading apparatus 10 according to the first embodiment of the present invention are denoted by identical reference characters, and will not be described in detail below.

As shown in FIGS. 9 and 10, the image information reading apparatus 200 has an apparatus housing 200a including a front wall which has a cassette loading section 202 for receiving a single cassette 18, and a cassette placing section 204 disposed below the cassette loading section 202 for placing a stack of cassettes 18 thereon. As shown in FIG. 10, a sheet feeder 206 is disposed behind the cassette loading section 202 for removing a stimulable phosphor sheet 22 from the cassette 18 loaded in the cassette loading section 202 and returning a stimulable phosphor sheet 22, from which radiation image information has been read and remaining radiation image information has been erased, to the cassette 18 in the cassette loading section 202. The image information reading apparatus 200 also has an erasing unit 110 positioned alongside of a vertical feed path of a feed system 58.

The image information reading apparatus 200 operates as follows: The operator places a plurality of cassettes 18 housing stimulable phosphor sheets 22 from which recorded radiation image information is to be read are placed on the cassette placing section 204, and then loads the uppermost one of the cassettes 18 into the cassette loading section 202.

The stimulable phosphor sheet 22 stored in the cassette 18 is removed from the cassette 18 by the sheet feeder 206, and then fed to the reading unit 112 by the feed system 58. In the reading unit 112, as with the first embodiment, while the stimulable phosphor sheet 22 is being fed in the auxiliary scanning direction indicated by the arrow A, the laser beam L is applied to the stimulable phosphor sheet 22 to photoelectrically read the radiation image information recorded thereon. The stimulable phosphor sheet 22 is then fed back by the feed system 58 to the erasing unit 110, which erases remaining radiation image information from the stimulable phosphor sheet 22.

Then, the stimulable phosphor sheet 22 is returned into the cassette 18 by the sheet feeder 206, and the operator removes the cassette 18 from the cassette loading section 202. The operator then places the cassette 18 beneath the stack of cassettes 18 in the cassette placing section 204, and loads the uppermost one of the stacked cassettes 18 into the cassette loading section 202 for reading recorded radiation image information and erasing remaining radiation image information as described above.

In the second embodiment, the operator can place a plurality of cassettes 18 in the cassette placing section 204 immediately below the cassette loading section 202, and can handle the cassettes 18 efficiently between the cassette placing section 204 and the cassette loading section 202. Therefore, the image information reading apparatus 200 offers the same advantages as the image information reading apparatus 10 according to the first embodiment.

If there are a plurality of image information reading apparatus 200, then the operator places a stack of cassettes 18 in the cassette placing section 204 of one of the image information reading apparatus 200, and loads the uppermost cassette 18 of the stack into the cassette loading section 202 of the image information reading apparatus 200. Then, the operator carries the remaining cassettes 18 to another image information reading apparatus 200, and loads one of the cassettes 18 into the cassette loading section 202 of the image information reading apparatus 200. In this manner, the operator can handle the cassettes 18 highly efficiently.

According to the first and second embodiments, cassettes 18 are loaded in a horizontal posture into the cassette loading sections 20, 202. Therefore, cassettes 18 are placed in a horizontal posture in the cassette placing sections 40, 204, so that the cassettes 18 can be maintained substantially parallel to each other in the cassette loading sections 20, 202 and the cassette placing sections 40, 204. If a cassette loading section is to receive a loaded cassette obliquely, then a cassette placing section is to place the cassette obliquely. Furthermore, while the cassette placing sections 40, 204 are positioned immediately below the cassette loading sections 20, 202 in the first and second embodiments, the cassette placing sections 40, 204 may be positioned laterally of the cassette loading sections 20, 202.

Figure 11:
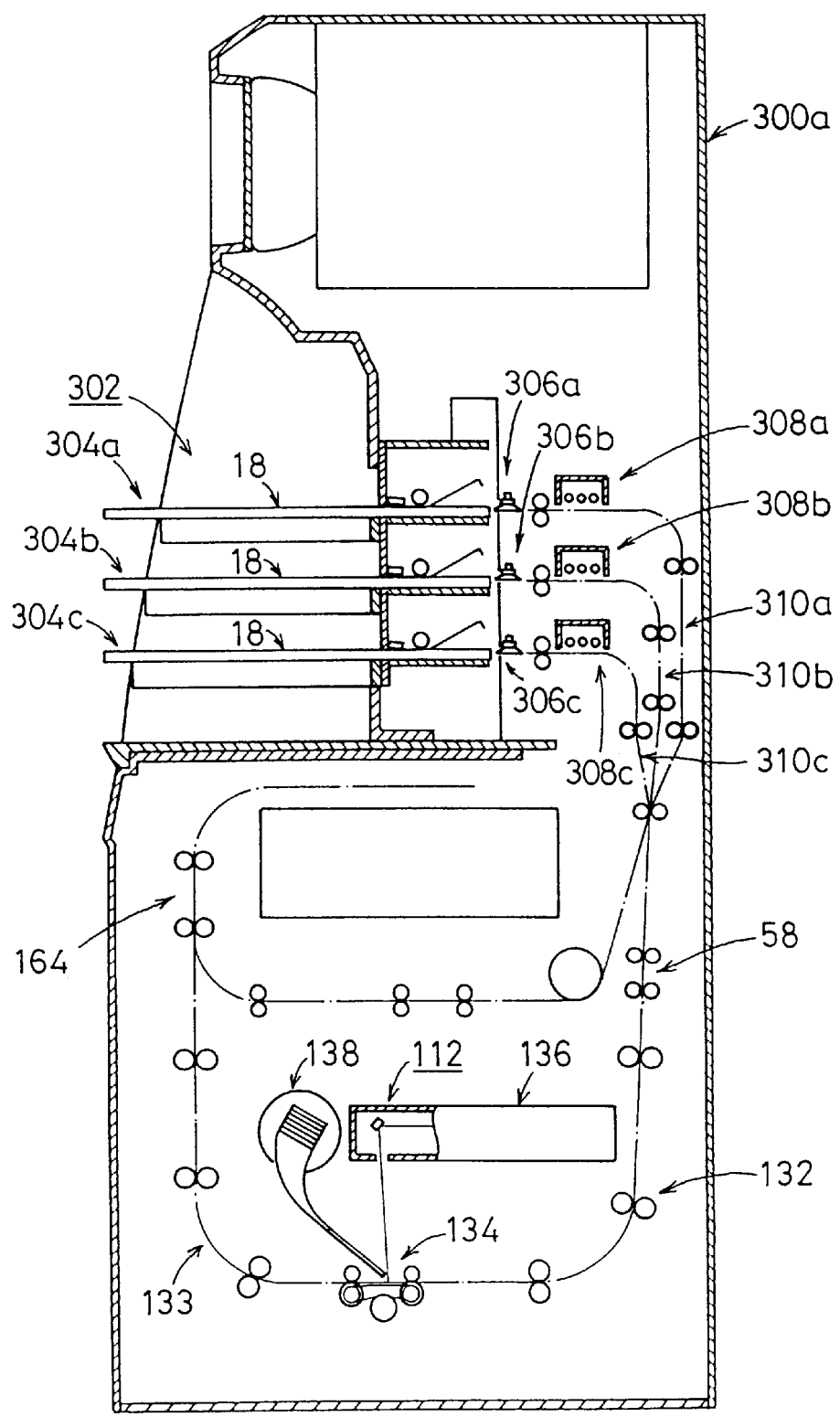
FIG. 11 is a vertical cross-sectional view of an image information reading apparatus according to a third embodiment of the present invention.
Figure 12:
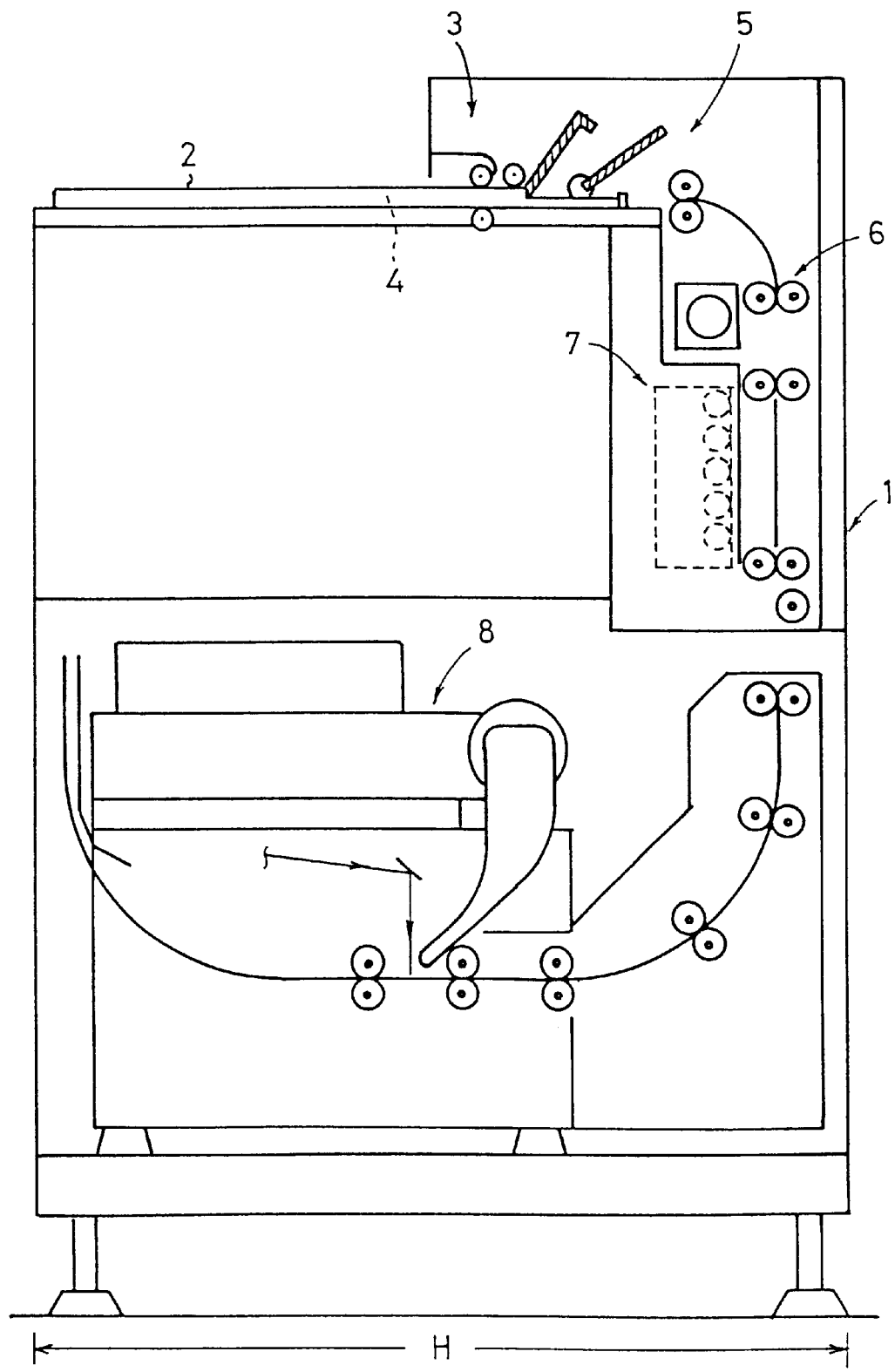
FIG. 12 is a vertical cross-sectional view of the image information reading apparatus according to a conventional art.

FIG. 11 shows in cross section an image information reading apparatus 300 according to a third embodiment of the present invention. Those parts of the image information reading apparatus 300 which are identical to those of the image information reading apparatus 10 according to the first embodiment of the present invention are denoted by identical reference characters, and will not be described in detail below.

As shown in FIG. 11, the image information reading apparatus 300 has an apparatus housing 300a including a front wall which has a cassette loading section 302 including a vertical array of three loading regions, i.e., first, second, and third loading regions 304a, 304b, 304c. The apparatus housing 300a accommodates therein three sheet feeders, i.e., first, second, and third sheet feeders 306a, 306b, 306c, horizontally aligned respectively with the first, second, and third loading regions 304a, 304b, 304c, and three erasing units, i.e., first, second, and third erasing units 308a, 308b, 308c, horizontally aligned respectively with the first, second, and third sheet feeders 306a, 306b, 306c.

First, second, and third path switching mechanisms 310a, 310b, 310c are disposed between the first, second, and third erasing units 308a, 308b, 308c and a feed system 58 disposed therebelow. The first, second, and third path switching mechanisms 310a, 310b, 310c serve to connect a selected one of the first, second, and third erasing units 308a, 308b, 308c to the feed system 58.

The image information reading apparatus 300 operates as follows: A stimulable phosphor sheet 22 removed from the cassette 18 loaded in the first loading region 304a is delivered to a reading unit 112, which reads recorded radiation image information from the stimulable phosphor sheet 22. Thereafter, the stimulable phosphor sheet 22 is fed to the first erasing unit 308a. At this time, a stimulable phosphor sheet 22 is removed from the cassette 18 loaded in the second loading region 304b, and delivered to the reading unit 112. Therefore, at the same time that remaining radiation image information is erased from the stimulable phosphor sheet 22 by the first erasing unit 308a, the reading unit 112 reads recorded radiation image information from the stimulable phosphor sheet 22 supplied from the cassette 18 loaded in the second loading region 304b. Consequently, the image information reading apparatus 300 can process a plurality of stimulable phosphor sheets at a high speed.

In the image information reading apparatus according to the present invention, the apparatus housing has the cassette placing section disposed directly below the cassette loading section. Because the operator places a given number of cassettes to be processed in the cassette placing section, the operator does not need to temporarily place the cassettes, which store respective stimulable phosphor sheets that are processed or to be processed, on a dedicated table placed near the image information reading apparatus. Therefore, no table installation space needs to be provided around the image information reading apparatus, and the operator can easily handle cassettes efficiently. Since the cassette placing section is disposed directly below the cassette loading section, the operator can handle a plurality of cassettes smoothly and quickly in the vertical direction for increased efficiency.

Further, in the image information reading apparatus according to the present invention, the cassette loading section, the erasing unit and the reading unit are aligned vertically and downwardly in the order recited. Accordingly, the floor space for placing the entire image information reading apparatus can be minimized, which results in effective utilization of space.

Although certain preferred embodiments of the present invention have been shown and described in detail, it should be understood that various changes and modifications may be made therein without departing from the scope of the appended claims.

What is claimed is:

1. An image information reading apparatus comprising:
   an apparatus housing;
   a cassette loading section disposed in said apparatus housing for receiving a cassette removably loaded therein, the cassette storing a stimulable phosphor sheet therein;
   a sheet feeder disposed in said apparatus housing for removing the stimulable phosphor sheet from the cassette loaded in said cassette loading section;
   a reading unit disposed in said apparatus housing for reading radiation image information recorded on the stimulable phosphor sheet removed from the cassette;
   an erasing unit disposed in said apparatus housing for erasing remaining radiation image information from the stimulable phosphor sheet after the radiation image information has been read from the stimulable phosphor sheet by said reading unit; and
   a cassette placing section disposed in said apparatus housing for temporarily placing the cassette therein.

2. An image information reading apparatus according to claim 1, wherein said cassette placing section is disposed near and in one of positions leftward, rightward and downward with respect to said cassette loading section.

3. An image information reading apparatus according to claim 1, wherein said cassette placing section has means for placing thereon the cassette substantially parallel to a posture in which the cassette is loaded in said cassette loading section.

4. An image information reading apparatus according to claim 2, wherein said cassette placing section has means for placing thereon the cassette substantially parallel to a posture in which the cassette is loaded in said cassette loading section.

5. An image information reading apparatus according to claim 2, wherein the cassette is placed in a horizontal posture in said cassette placing section.

6. An image information reading apparatus according to claim 3, wherein the cassette is placed in a horizontal posture in said cassette placing section.

7. An image information reading apparatus according to claim 1, wherein said cassette placing section has a cassette holding base for placing a stack of cassettes thereon.

8. An image information reading apparatus according to claim 7, wherein said cassette holding base is fixed selectively in a plurality of positions with respect to said apparatus housing.

9. An image information reading apparatus according to claim 7, wherein said cassette holding base has an engaging member for positioning a cassette of smaller size than said cassettes.

10. An image information reading apparatus according to claim 1, wherein said cassette loading section has means for receiving a vertical array of cassettes therein, said cassette placing section having means for placing thereon a stack of at least as many cassettes as the number of the cassettes which can be received by said cassette loading section.

11. An image information reading apparatus according to claim 1, wherein said cassette loading section has means for receiving a single cassette therein, said cassette placing section having means for placing a stack of cassettes thereon.

12. An image information reading apparatus comprising:
    an apparatus housing;
    a cassette loading section disposed in said apparatus housing for receiving a cassette removably loaded therein, the cassette storing a stimulable phosphor sheet therein, a recordable surface of the stimulable phosphor sheet facing downward;
    a sheet feeder disposed in said apparatus housing for removing the stimulable phosphor sheet from the cassette loaded in said cassette loading section;
    a reading unit disposed in said apparatus housing for reading radiation image information recorded on the stimulable phosphor sheet removed from the cassette, with the recordable surface of the stimulable phosphor sheet facing upward;
    an erasing unit disposed in said apparatus housing for erasing remaining radiation image information from the stimulable phosphor sheet with the recordable surface of the stimulable phosphor sheet facing upward after the radiation image information has been read from the stimulable phosphor sheet by said reading unit, and
    a cassette placing section disposed in said apparatus housing for temporarily placing the cassette therein,
    wherein said cassette loading section, said erasing unit and said reading unit are aligned vertically and downwardly such that said cassette loading section is the uppermost unit and said erasing unit is positioned between said cassette loading section and said reading unit.

13. An image information reading apparatus according to claim 12, wherein said cassette loading section has a stacked cassette configuration which allows a plurality of the cassettes to be stacked one another, said cassette loading section comprising:

a first sheet feeding section for feeding the stimulable phosphor sheet from said cassette loading section to said reading unit; and a second sheet feeding section for feeding the stimulable phosphor sheet from said reading unit to a vertical part of said first sheet feeding section through said erasing unit, wherein the stimulable phosphor sheets can be substantially simultaneously processed in said reading unit and said erasing unit, respectively.

14. An image information reading apparatus comprising:

an apparatus housing;

a cassette loading section disposed in said apparatus housing for receiving a cassette removably loaded therein, the cassette storing a stimulable phosphor sheet therein;

a sheet feeder disposed in said apparatus housing for removing the stimulable phosphor sheet from the cassette loaded in said cassette loading section;

a reading unit disposed in said apparatus housing for reading radiation image information recorded on the stimulable phosphor sheet removed from the cassette;

an erasing unit disposed in said apparatus housing for erasing remaining radiation image information from the stimulable phosphor sheet after the radiation image information has been read from the stimulable phosphor sheet by said reading unit; and a cassette placing section defined by a cavity in said apparatus housing, said cavity being disposed below said cassette loading section, said cassette being temporarily placed in said cavity.

15. The image information reading apparatus according to claim 14, further comprising a movable engaging member disposed within said cavity, wherein at least one portion of said cassette abuts said engaging member, and a position of said engaging member within said cavity defines a size of said cassette placing section.

* * * * *